(12) United States Patent
Zook

(10) Patent No.: US 12,458,414 B1
(45) Date of Patent: *Nov. 4, 2025

(54) LUMBAR SPINOUS PROCESS STATIC AND DYNAMIC STABILIZATION DEVICE

(71) Applicant: Jason Zook, Valdese, NC (US)

(72) Inventor: Jason Zook, Valdese, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,568

(22) Filed: Apr. 22, 2024

Related U.S. Application Data

(63) Continuation of application No. 18/182,174, filed on Mar. 10, 2023, now abandoned, which is a continuation of application No. 17/485,923, filed on Sep. 27, 2021, now Pat. No. 11,627,997.

(60) Provisional application No. 63/086,287, filed on Oct. 1, 2020.

(51) Int. Cl.
*A61B 17/70* (2006.01)

(52) U.S. Cl.
CPC ...... *A61B 17/7067* (2013.01); *A61B 17/7068* (2013.01)

(58) Field of Classification Search
CPC ............ A61B 17/7086; A61B 17/7062; A61B 17/7064; A61B 17/7065; A61B 17/7067; A61B 17/707
See application file for complete search history.

(56) References Cited

U.S. PATENT DOCUMENTS

| | | | | | |
|---|---|---|---|---|---|
| 5,885,284 | A | * | 3/1999 | Errico | A61B 17/7052 606/252 |
| 6,126,660 | A | * | 10/2000 | Dietz | A61B 17/025 606/90 |
| 2002/0116000 | A1 | * | 8/2002 | Zucherman | A61B 17/7062 606/279 |
| 2004/0102778 | A1 | * | 5/2004 | Huebner | A61B 17/8033 606/71 |
| 2006/0241601 | A1 | * | 10/2006 | Trautwein | A61B 17/7067 606/279 |
| 2006/0293662 | A1 | * | 12/2006 | Boyer, II | A61B 17/1671 606/249 |
| 2008/0234733 | A1 | * | 9/2008 | Scrantz | A61B 17/7062 606/151 |

(Continued)

FOREIGN PATENT DOCUMENTS

WO WO-2007051172 A1 * 5/2007 ......... A61B 17/7065
WO WO-2015072655 A1 * 5/2015 ......... A61B 17/7065

*Primary Examiner* — Julianna N Harvey
*Assistant Examiner* — Anna V. Little
(74) *Attorney, Agent, or Firm* — Stites & Harbison, PLLC; David W. Nagle, Jr.; Gary N. Stewart

(57) ABSTRACT

A lumbar process static and dynamic stabilization device includes: an upper arm configured to receive and be affixed to a first spinous process of one vertebrae; and a lower arm configured to receive and be affixed to a second spinous process of another vertebrae. The upper arm and the lower arm are pivotally connected, such that the upper arm and the lower arm can pivot relative to each other to transition the device to a desired orientation. At the same time, the device can be selectively locked into either a static configuration by a locking mechanism or allowed to move dynamically, such that the upper arm and the lower arm of the device are allowed to move relative to each other in response to manipulation of the portion of the lumbar spine on which the device is implemented.

3 Claims, 17 Drawing Sheets

(56) References Cited

U.S. PATENT DOCUMENTS

| | | | |
|---|---|---|---|
| 2010/0036419 A1* | 2/2010 | Patel | A61B 17/7062 606/279 |
| 2011/0087286 A1* | 4/2011 | Ciupik | A61B 17/7065 606/279 |
| 2012/0226312 A1* | 9/2012 | Thalgott | A61B 17/7067 606/279 |
| 2013/0030471 A1* | 1/2013 | Ramsay | A61B 17/7065 606/279 |
| 2015/0012040 A1* | 1/2015 | Agarwal | A61B 17/7068 606/248 |
| 2016/0022324 A1* | 1/2016 | Yoon | A61B 17/7062 606/252 |

\* cited by examiner

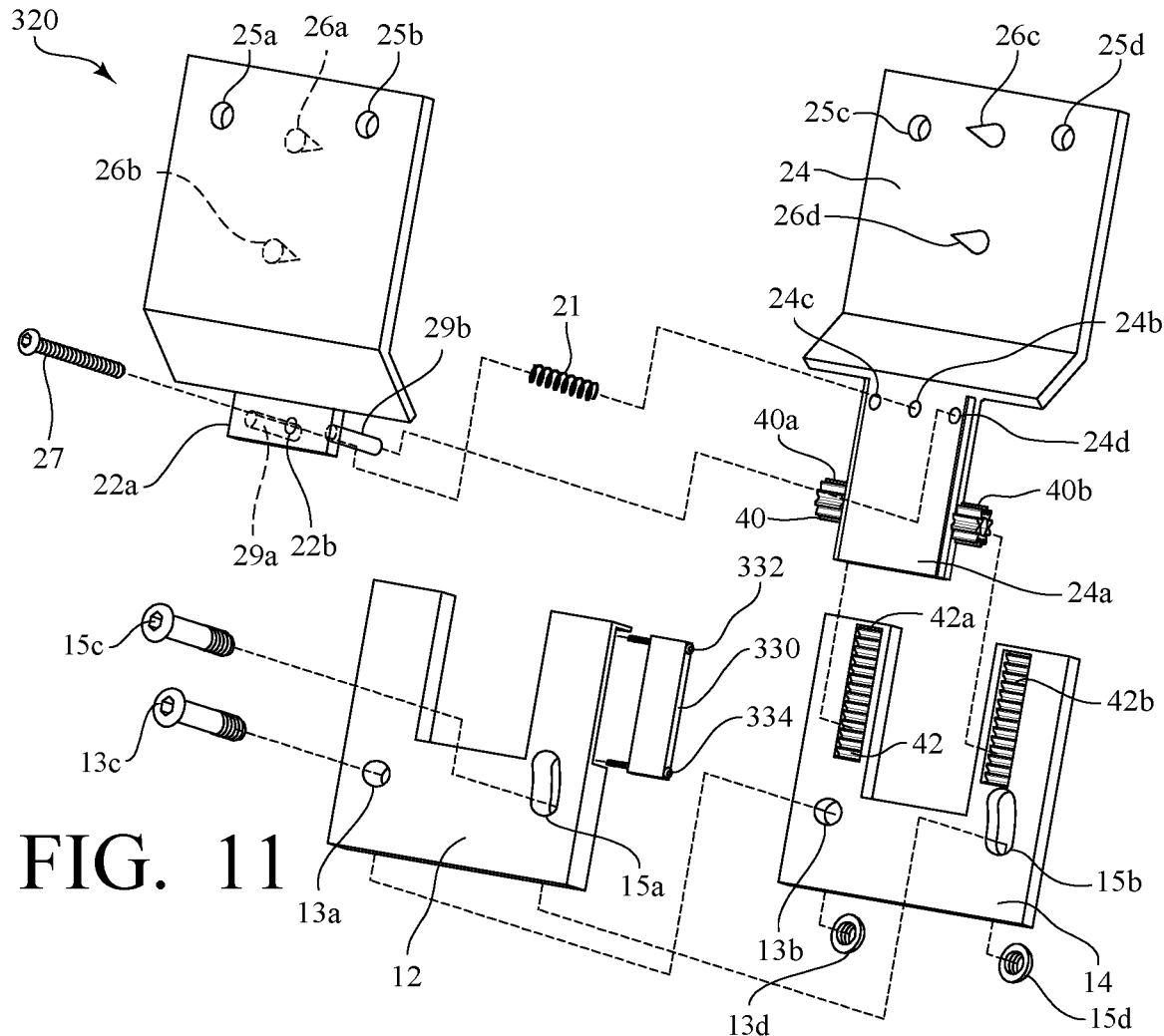
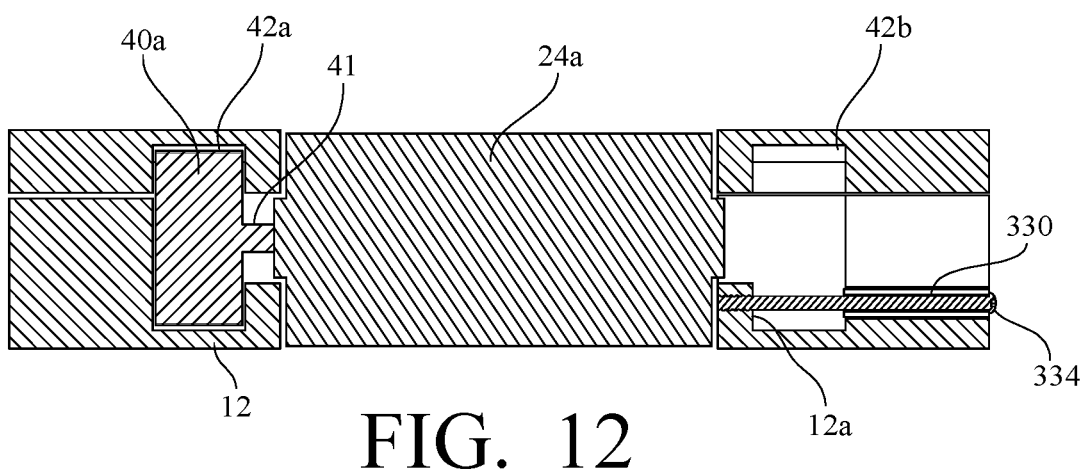

LUMBAR SPINOUS PROCESS STATIC AND DYNAMIC STABILIZATION DEVICE

CROSS-REFERENCE TO RELATED APPLICATIONS

The present application is a continuation of U.S. patent application Ser. No. 18/182,174 filed on Mar. 10, 2023, which is a continuation of U.S. patent application Ser. No. 17/485,923 filed on Sep. 27, 2021, now U.S. Pat. No. 11,627,997, which claims priority to U.S. Patent Application Ser. No. 63/086,287 filed on Oct. 1, 2020, the entire disclosures of which are incorporated herein by reference.

BACKGROUND OF THE INVENTION

Spinal fusion is a surgical procedure in which two or more vertebrae are joined (or fused) into a single structure. In general, spinal fusion is used to decompress and stabilize the spine by preventing any movement of the fused vertebrae relative to one another. Spinal fusion commonly requires the use of certain hardware (e.g., plates, screws, etc.), in combination with bone grafts or artificial bone substitutes, to fuse the vertebrae.

A laminectomy is a surgical procedure in which a portion of the lamina (which is a posterior arch of the vertebral bone) is removed. A laminectomy can be used to treat spinal stenosis by relieving pressure on the spinal cord. A laminectomy is also commonly performed to permit the removal or reshaping of a spinal disc as part of a treatment for a herniated, bulging, or degenerated spinal disc.

Although a wide range of devices exist in the art, such devices are designed only for stabilization for fusion or to stabilize a partial laminectomy. There are no known devices that can be used both in a stabilized, fusion supplementation and in a dynamic (non-fusion) setting as a stabilizing device for a lumbar laminectomy.

SUMMARY OF THE INVENTION

The present invention is a lumbar process static and dynamic stabilization device for use both in a stabilized, fusion supplementation and in a dynamic (non-fusion) setting as a stabilizing device for a lumbar laminectomy.

An exemplary lumbar process static and dynamic stabilization device made in accordance with the present invention is, in use, affixed to two spinous processes of a lumbar spine, spanning across one or more vertebrae interspaces. Thus, in some embodiments, the length of the device is adjustable to provide a construct that can extend between the spinous processes of two directly adjacent vertebrae or can extend across multiple vertebrae interspaces.

An exemplary lumbar process static and dynamic stabilization device made in accordance with the present invention generally includes: an upper arm configured to receive and be affixed to a first spinous process of one vertebrae; and a lower arm configured to receive and be affixed to a second spinous process of another vertebrae. The upper arm and the lower arm are pivotally connected, such that the upper arm and the lower arm can pivot relative to each other to transition the device to a desired orientation. At the same time, the device can be selectively locked into either a static configuration by a locking mechanism or allowed to move dynamically, such that the upper arm and the lower arm of the device are allowed to move relative to each other in response to manipulation of the portion of the lumbar spine on which the device is implemented. The device of the present invention can thus function as either a fixed-angle or variable angle construct, such that it can be utilized in fusion-based applications or settings (e.g., to supplement anterior instrumentation during lumbar fusion) and non-fusion-based applications or settings alike.

In some embodiments, the upper arm can be characterized as including: a base, which is secured to the lower arm; and a brace, which is configured to receive and be affixed to a first target spinous process. In this regard, the brace of the upper arm has a shape similar to that of a stirrup, with a first side portion and a second side portion which define a cavity in which the first spinous process is received. The first side portion and second side portion may be provided with openings, so that bicortical or unicortical screws can be inserted as necessary through the first side portion and/or the second side portion to secure the first spinous process in the cavity of the brace of the upper arm. Furthermore, the interior surfaces of the first and second side portions of the brace may also be provided with bone spikes to further assist in securing the brace of the upper arm to the first spinous process.

Similarly, in some embodiments, the lower arm can be characterized as including: a base, which is secured to the upper arm; and a brace, which is configured to receive and be affixed to a second target spinous process. In this regard, the brace of the lower arm also has a shape similar to that of a stirrup, with a first side portion and a second side portion which define a cavity in which the second spinous process is received. The first side portion and second side portion may be provided with openings, so that bicortical or unicortical screws can be inserted as necessary through the first side portion and/or the second side portion to secure the second spinous process in the cavity of the brace of the lower arm. Furthermore, the interior surfaces of the first and second side portions of the brace may also be provided with bone spikes to further assist in securing the brace of the lower arm to the second spinous process.

With respect to each of the upper arm and the lower arm, in some embodiments, a distance between the first side portion and the second side portion can be adjusted, widening or narrowing the cavity configured to receive the first spinous process or the second spinous process of the spine.

Furthermore, as noted above, in some embodiments, the length of the device is adjustable to provide a construct that can extend between the spinous processes of two directly adjacent vertebrae or can extend across multiple vertebrae interspaces. Such adjustment may be achieved via adjustment of the positioning of the brace relative to the base of either or both of the upper arm and the lower arm. For instance, in some embodiments, movement of the brace relative to the base is accomplished by a rack-and-pinion arrangement. Once the device has been set to a desired length, the positioning of the pinion along the rack can be fixed via a locking mechanism.

DESCRIPTION OF THE DRAWINGS

FIG. 11 is an exploded perspective view of the alternate arm of FIG. 10;

FIG. 12 is a sectional view of the alternate arm of FIG. 10, taken along line 12-12 of FIG. 10;

DETAILED DESCRIPTION OF THE INVENTION

The present invention is a lumbar process static and dynamic stabilization device for use both in a stabilized, fusion supplementation and in a dynamic (non-fusion) setting as a stabilizing device for a lumbar laminectomy.

Figure 1:
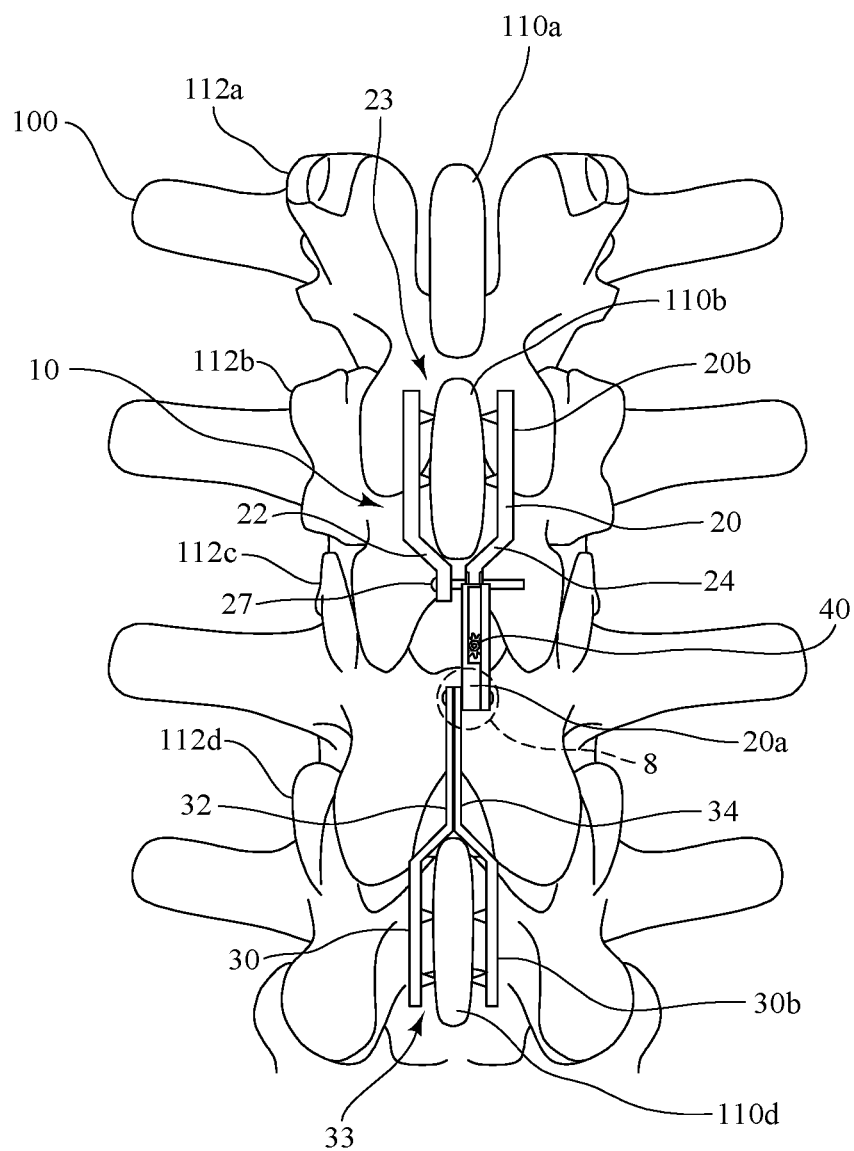
FIG. 1 is a view of an exemplary lumbar process static and dynamic stabilization device made in accordance with the present invention and affixed to two spinous processes of a lumbar spine.

FIG. 1 is a view of an exemplary lumbar process static and dynamic stabilization device 10 (or device 10) made in accordance with the present invention.

Figure 1A:
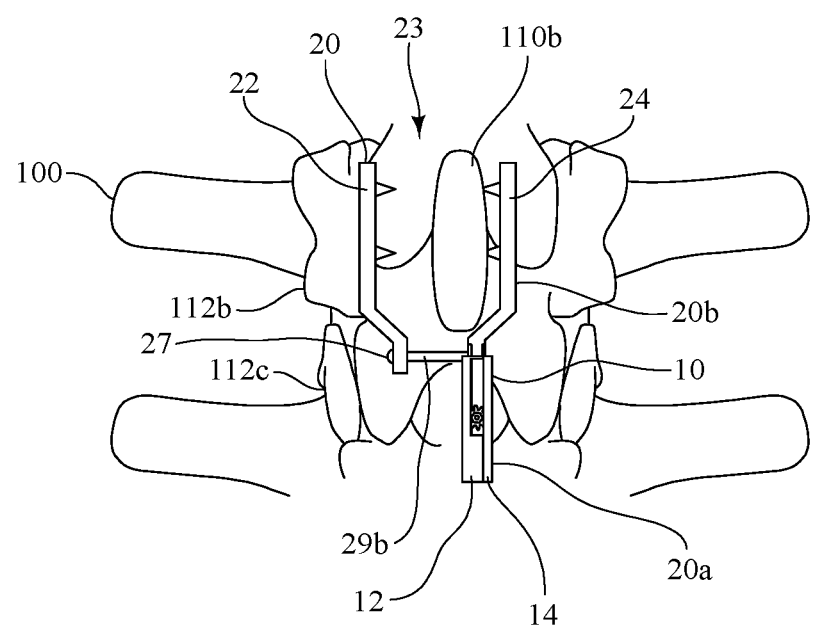
FIG. 1A is a partial view of the lumbar spine and the exemplary lumbar process static and dynamic stabilization device of FIG. 1, with the cavity of the upper arm of the device in a widened configuration.

FIG. 1A is a partial view of the lumbar spine and the exemplary lumbar process static and dynamic stabilization device 10 of FIG. 1, with a cavity 23 of the upper arm 20 of the device 10 in a widened configuration, as further described below.

Referring now to FIG. 1, an exemplary lumbar process static and dynamic stabilization device 10 made in accordance with the present invention is affixed to two spinous processes 110b, 110d of a lumbar spine 100, which includes a first vertebrae 112a, a second vertebrae 112b, a third vertebrae 112c, and a fourth vertebrae 112d. In this particular implementation, a laminectomy has been performed on the third vertebrae 112c, such that the spinous process corresponding to the third vertebrae 112c has been removed. The device 10 has been affixed to the spinous process 110b corresponding to the second vertebrae 112b and the spinous process 110d corresponding to the fourth vertebrae 112d to provide a support construct spanning between the second vertebrae 112b and the fourth vertebrae 112d. Accordingly, in this particular implementation, the device 10 thus spans across multiple vertebrae interspaces (i.e., the space between the second vertebrae 112b and the third vertebrae 112c and the space between the third vertebrae 112c and the fourth vertebrae 112d). It is appreciated, however, that the exhibited length of the device 10 can be adjusted to provide a construct extending between the spinous processes of two directly adjacent vertebrae (e.g., between the spinous process 110a corresponding to the first vertebrae 112a and the spinous process 110b corresponding to the second vertebrae 112b), and thus only span a single vertebrae interspace. In this regard, it is thus contemplated that, in some implementations, the device 10 may be utilized for a spinal support even in non-laminectomy-based procedures or spines on which a laminectomy has not been performed.

Figure 2A:
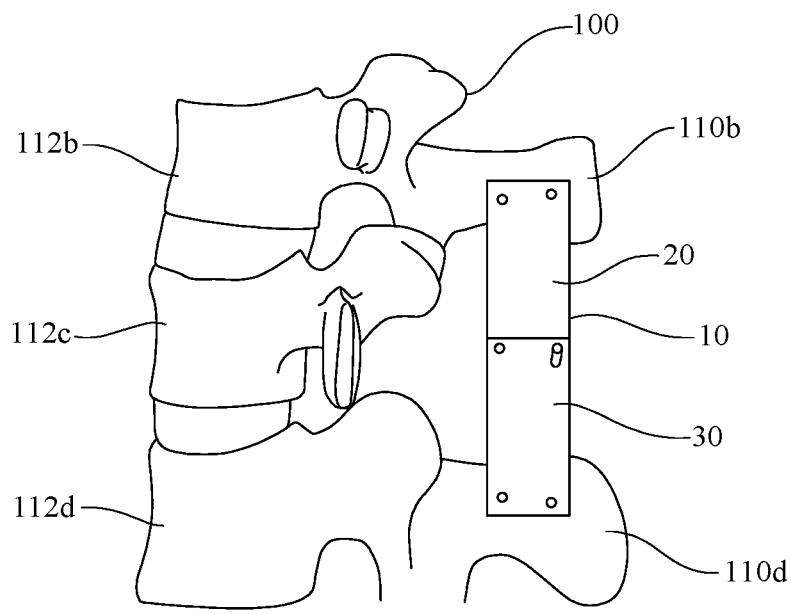
FIG. 2A is a schematic representation of the exemplary lumbar process static and dynamic stabilization device of FIG. 1.

FIG. 2A is a partial side view of the lumbar spine 100 of FIG. 1, with a schematic representation of the device 10 affixed to two spinous processes 110b, 110d and in a straightened orientation.

Figure 2B:
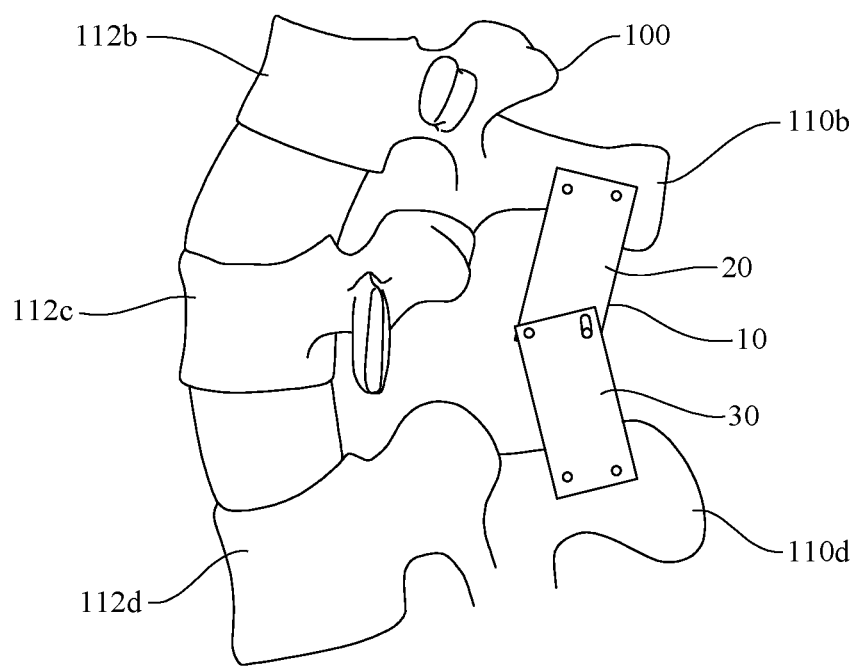
FIG. 2B is another schematic representation of the exemplary lumbar process static and dynamic stabilization device of FIG. 1.

FIG. 2B is a partial side view of the lumbar spine 100 similar to FIG. 2A, but with the schematic representation of the device 10 in an articulated orientation.

Referring now to FIGS. 1, 2A, and 2B, the device 10 generally includes an upper arm 20 configured to be affixed to a first spinous process of one vertebrae and a lower arm 30 configured to be affixed to a second spinous process of another vertebrae. As shown best in FIGS. 2A and 2B, the upper arm 20 and the lower arm 30 are pivotally connected, such that the upper arm 20 and the lower arm 30 can pivot relative to each other to transition the device 10 to a desired orientation, for example, a straightened orientation as shown in FIG. 2A or an articulated orientation as shown in FIG. 2B. As further described below, the device 10 can be selectively locked into either a static configuration by a locking mechanism or allowed to move dynamically, such that the upper arm 20 and the lower arm 30 of the device 10 are allowed to move relative to each other in response to manipulation of the portion of the lumbar spine 100 on which the device 10 is implemented. The device 10 of the present invention can thus function as either a fixed-angle or variable angle construct, such that it can be utilized in fusion-based applications or settings (e.g., to supplement anterior instrumentation during lumbar fusion) and non-fusion-based applications or settings alike.

Figure 3:
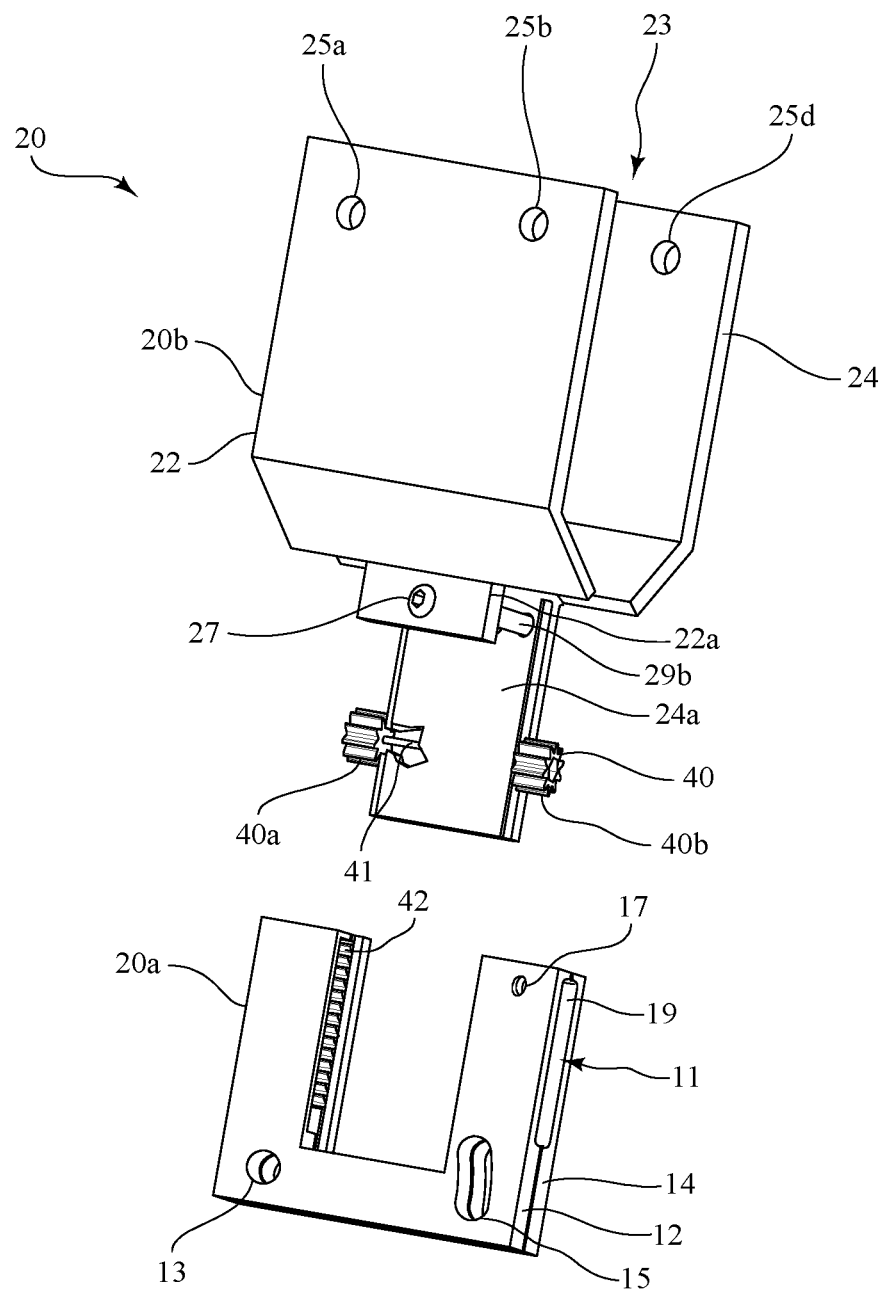
FIG. 3 is a perspective view of the upper arm of the exemplary lumbar process static and dynamic stabilization device of FIG. 1, with a base of the upper arm disassociated from a brace of the upper arm.

FIG. 3 is a perspective view of the upper arm 20 of the device 10 of FIG. 1, with a base 20a of the upper arm 20 disassociated from a brace 20b of the upper arm 20.

Figure 4:
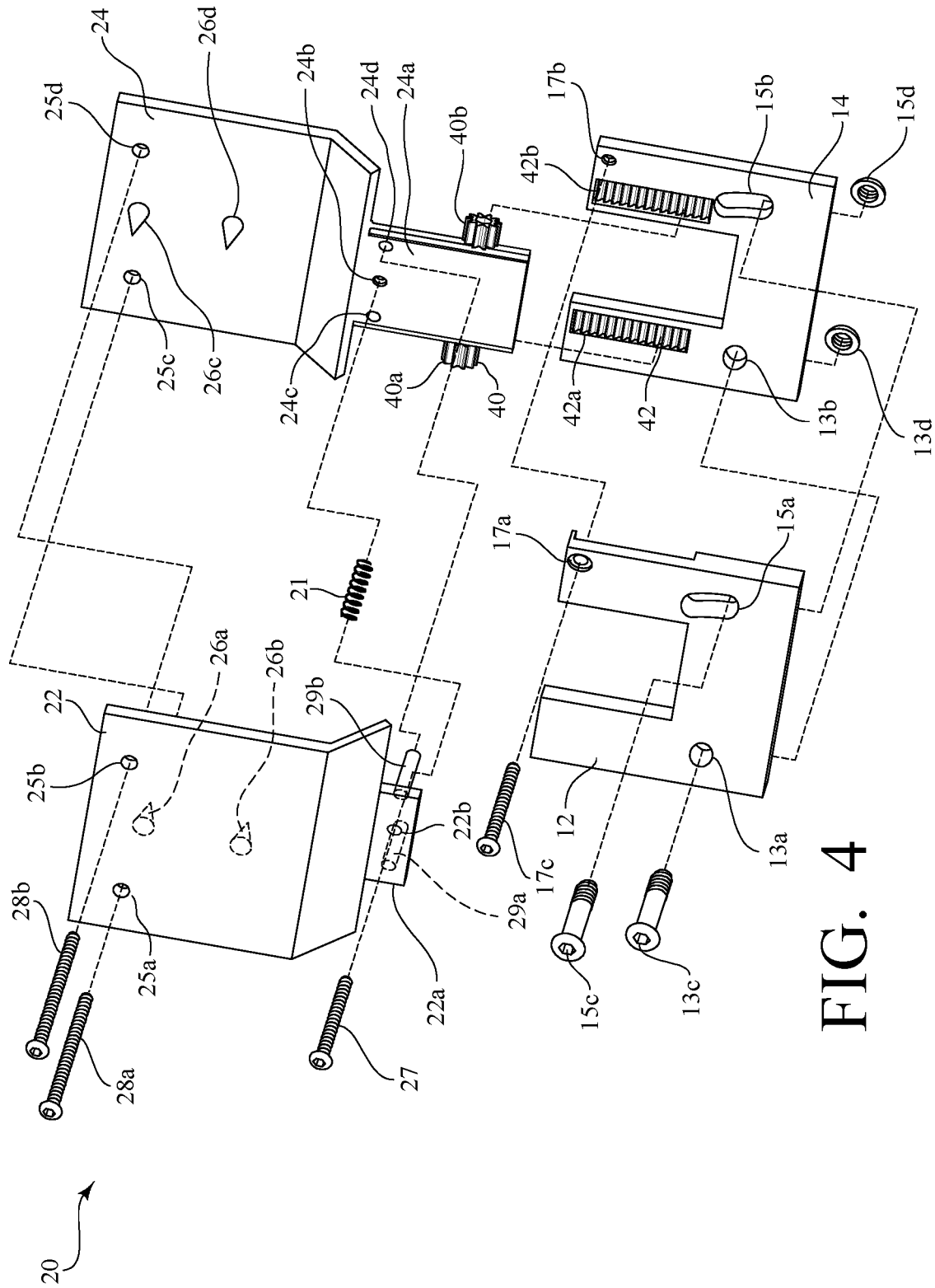
FIG. 4 is an exploded perspective view of the upper arm of the exemplary lumbar process static and dynamic stabilization device of FIG. 1.

FIG. 4 is an exploded perspective view of the upper arm 20 of the device of FIG. 1.

Figure 5A:
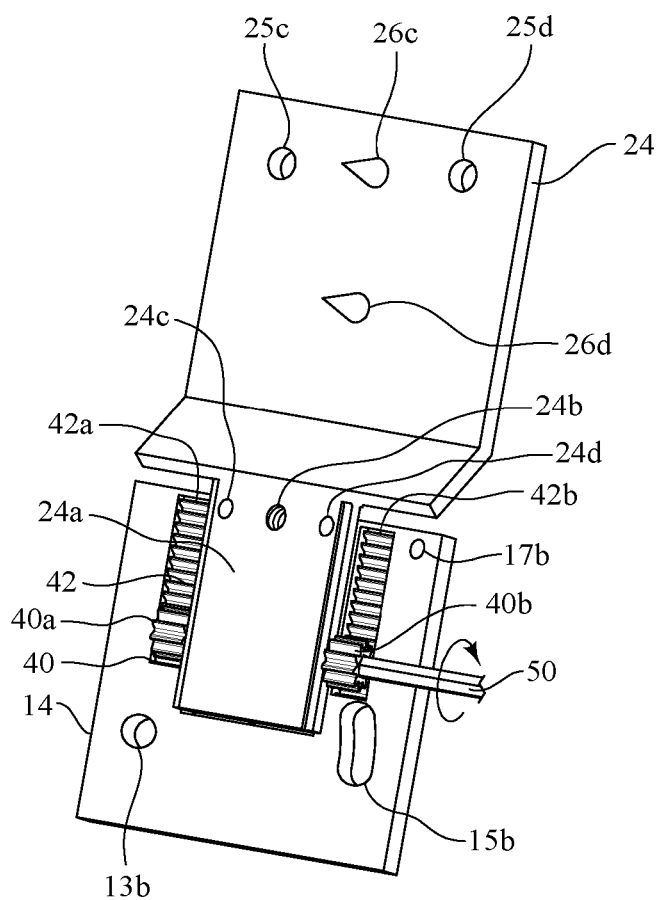
FIG. 5A is a partial view of the upper arm of the exemplary lumbar process static and dynamic stabilization device of FIG. 1, with the brace of the upper arm in a first (or lowered) position.

FIG. 5A is a partial view of the upper arm 20 of the device of FIG. 1, with the brace 20b of the upper arm 20 in a first (or lowered) position.

Figure 5B:
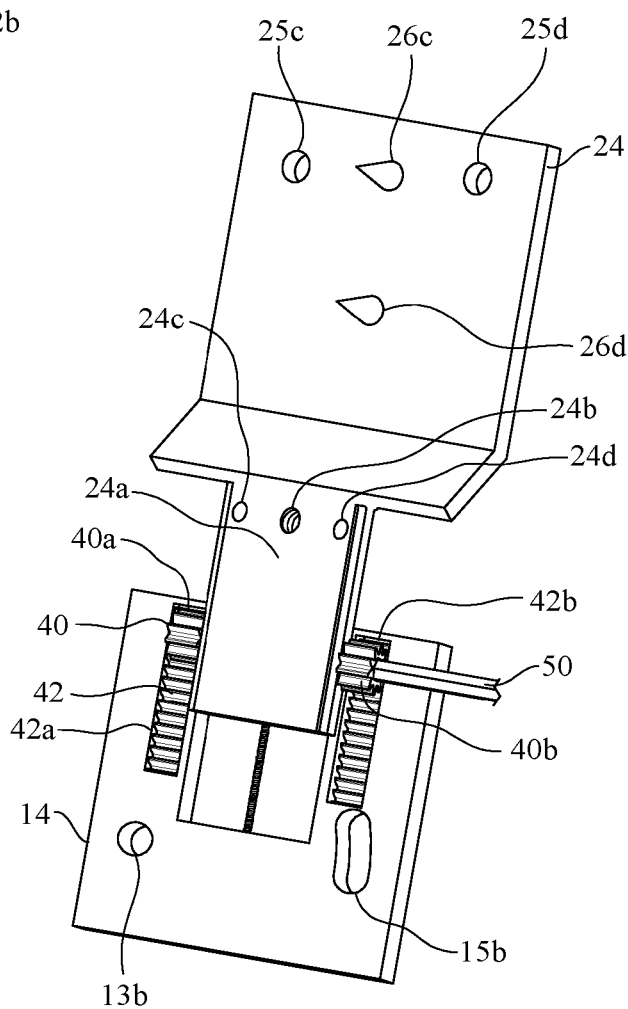
FIG. 5B is another partial view of the upper arm of the exemplary lumbar process static and dynamic stabilization device of FIG. 1, with the brace of the upper arm in a second (or raised) position.

FIG. 5B is a partial view of the upper arm 20 similar to FIG. 5A, but with the brace 20b of the upper arm 20 in a second (or raised) position.

Referring now to FIGS. 1, 1A, 3, 4, 5A, and 5B, the upper arm 20 can be characterized as including: the base 20a, which is secured to the lower arm 30; and the brace 20b, which is configured to receive and be affixed to a first target spinous process, which, in this example (FIGS. 1, 1A, 2A, and 2B), is the spinous process 110b corresponding to the second vertebrae 112b of the lumbar spine 100. In this regard, the brace 20b of the upper arm 20 has a shape similar to that of a stirrup, with a first side portion 22 and the second side portion 24 which define a cavity 23 in which the first spinous process is received.

Referring still to FIGS. 1, 1A, 3, 4, 5A, and 5B, in this exemplary embodiment, the first side portion 22 and second side portion 24 define a first pair of openings 25a, 25b and a second pair of openings 25c, 25d, respectively. The first pair of openings 25a, 25b and the second pair of openings 25c, 25d are aligned so that screws 28a, 28b, such as bicortical or unicortical screws, can be inserted as necessary through the first side portion 22 and/or the second side portion 24 to secure the first spinous process in the cavity 23 of the brace 20b of the upper arm 20. (Such screws 28a, 28b are not shown in FIGS. 1, 1A, 2, and 3.) As shown in FIGS. 1, 1A, 4, 5A, and 5B, in this exemplary embodiment, the interior surfaces of the first and second side portions 22, 24 of the brace 20b are also provided with bone spikes 26a, 26b, 26c, 26d to further assist in securing the brace 20b of the upper arm 20 to the first spinous process.

Referring still to FIGS. 1, 1A, 3, 4, 5A, and 5B, the first side portion 22 of the brace 20b includes a bracket 22a that extends downwardly from the portion of the first side portion 22, which again engages the first spinous process when the device 10 is in use. The second side portion 24 of the brace 20b includes a tongue 24a, which, like the bracket 22a of the first side portion 22, extends downwardly from the portion of the second side portion 24 that engages the first spinous process when the device 10 is in use. In this exemplary embodiment, the tongue 24a defined by the second side portion 24 is, however, more pronounced (i.e., longer) than the bracket 22a defined by the first side portion 22 of the brace 20b. The bracket 22a defines an opening 22b, and the tongue 24a defines a corresponding threaded opening 24b. A threaded fastener 27 can thus be inserted through the opening 22b defined by the bracket 22a and then into the threaded opening 24b defined by the second side portion 24.

Referring now specifically to FIG. 4, in this exemplary embodiment, the device 10 includes a spring 21 that is positioned between the first side portion 22 and the second side portion 24 of the brace 20b of the upper arm 20, with the fastener 27 passing through a central channel defined by the spring 21. The spring 21 provides a biasing force between the first side portion 22 and the second side portion 24. Furthermore, to maintain the first side portion 22 and the second side portion 24 in alignment with one another, in this exemplary embodiment, the device 10 further includes a first pin 29a and a second pin 29b. The first pin 29a extends from the bracket 22a and into an opening 24c defined by the tongue 24a. Similarly, the second pin 29b extends from the bracket 22a and into another opening 24d defined by the tongue 24a.

Referring now to FIGS. 1, 1A, and 4, in this exemplary embodiment, the fastener 27 securing the first side portion 22 to the second side portion 24 of the brace 20b of the upper arm 20 can be rotated (i.e., tightened or loosened) to reposition the first side portion 22 relative to the second side portion 24. In this regard, if the fastener is loosened, the spring 21 will push the first side portion 22 away from the second side portion 24. In this way, the distance between the first side portion 22 and the second side portion 24 can be adjusted. Thus, the cavity 23 defined by the brace 20b of the upper arm 20 can be widened or narrowed to accommodate spinal processes of different dimensions.

Referring now to FIGS. 3 and 4, the base 20a of the upper arm 20 includes a first base plate 12 and a second base plate 14. In this exemplary embodiment, when combined, the first base plate 12 and the second base plate 14 collectively define an interior cavity 11, as further described below. In this exemplary embodiment, and as best shown in FIG. 3, the first base plate 12 and the second base plate 14 also collectively define a first opening 13, a second opening 15, and a third opening 17. As best shown in FIG. 4, the first opening 13 is defined by a hole 13a defined by the first base plate 12 and a corresponding hole 13b defined by the second base plate 14. The second opening 15 is defined by an elongated slot 15a defined by the first base plate 12 and a corresponding elongated slot 15b defined by the second base plate 14. The third opening 17 is defined by a hole 17a defined by the first base plate 12 and a corresponding hole 17b defined by the second base plate 14. The function and use of these openings 13, 15, 17 will be further described below.

Now, as shown by viewing FIGS. 5A and 5B, in sequence, the tongue 24a (and thus the brace 20b as a whole) of the upper arm 20 is configured for movement with respect to the base 20a of the upper arm 20, such that that the brace 20b can be selectively raised or lowered to adjust the length of the upper arm 20, and, thus, the overall length of the device 10. In this way, the length of the device 10 can be selectively adjusted to span across one or more vertebrae interspaces to engage two target spinous processes, as further described below.

Referring now again to FIGS. 1, 3, 4, 5A, and 5B, in this exemplary embodiment, movement of the brace 20b relative to the base 20a of the upper arm 20 is accomplished by a rack-and-pinion arrangement. In this regard, the upper arm 20 includes a pinion 40 extending through and mounted for rotation with respect to the tongue 24a. The upper arm 20 further includes a rack 42 with a plurality of notches with which the pinion 40 can engage to reposition the brace 20b relative to the base 20a of the upper arm 20. In this exemplary embodiment, the rack 42 is defined by an interior surface of the second base plate 14 of the base 20a of the upper arm 20. As such, in use, the pinion 40 is effectively housed within the cavity 11 defined by the first base plate 12 and the second base plate 14 of the base 20a of the upper arm 20, where it engages the rack 42.

Figure 6A:
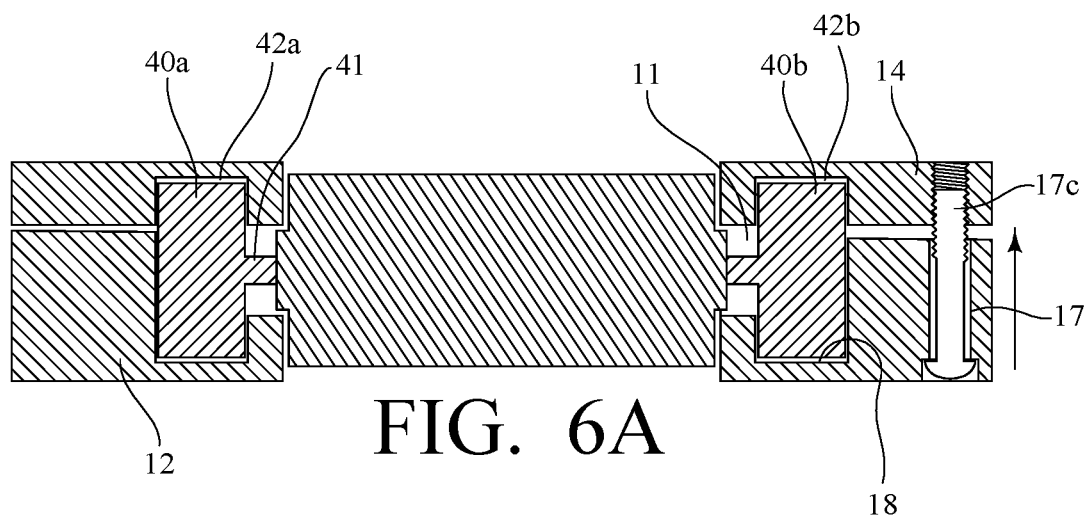
FIG. 6A is a sectional view of the upper arm of the exemplary lumbar process static and dynamic stabilization device of FIG. 1.
Figure 6B:
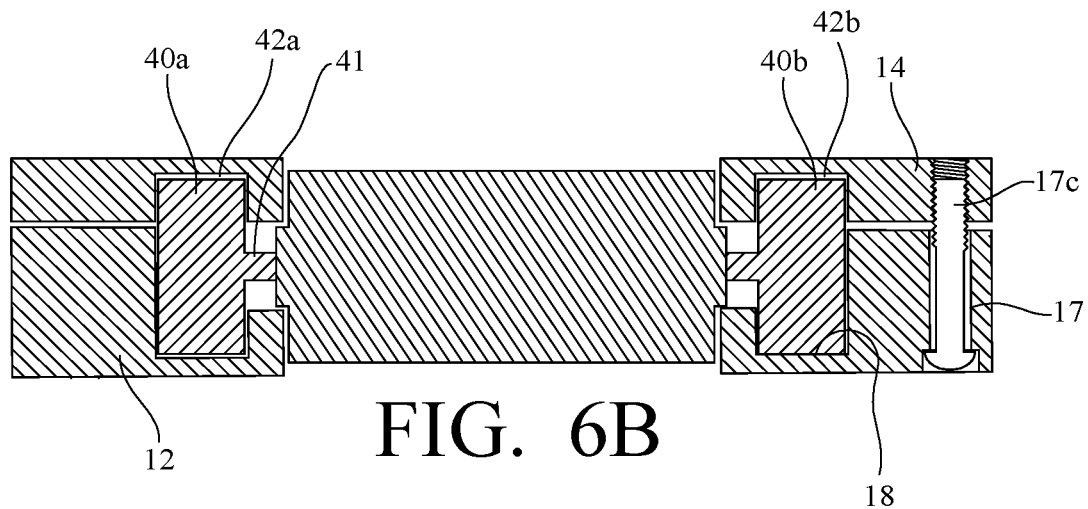
FIG. 6B is another sectional view of the upper arm of the exemplary lumbar process static and dynamic stabilization device of FIG. 1.

As best shown in FIGS. 3, 4, 5A, and 5B, in this exemplary embodiment, the pinion 40 includes a first head 40a and a second head 40b, which are mounted on opposing sides of the tongue 24a. The first head 40a of the pinion 40 engages a first track 42a of the rack 42, and the second head 40*b* of the pinion 40 engages a second track 42*b* of the rack 42. The first head 40*a* and the second head 40*b* of the pinion 40 are connected by an axle 41 (as shown in FIGS. 3, 6A, and 6B), such that, as one head of the pinion 40 is rotated, the other head simultaneously rotates. To drive rotation of the pinion 40, one or both of the first and second heads 40*a*, 40*b* are configured to receive a tool 50. As shown in FIGS. 5A and 5B, once engaged with the pinion 40, the tool 50 can be rotated to rotate the pinion 40 and move it along the first track 42*a* and second track 42*b* of the rack 42. To enable the tool 50 to access the pinion 40, the first base plate 12 and the second base plate 14 collectively define an access channel 19, as best shown in FIG. 3, which permits the tool 50 to be inserted into the cavity 11 defined by the first base plate 12 and the second base plate 14 of the base 20*a*.

FIG. 6A is a sectional view of the upper arm 20 of the device 10 of FIG. 1, taken just above a fastener 17*c* within the third opening 17, with the base 20*a* of the upper arm 20 in a first configuration which permits movement of the pinion 40 along the rack 42.

FIG. 6B is a sectional view similar to that of FIG. 6A, but with the fastener 17*c* further tightened to reduce the spacing between the first base plate 12 and the second base plate 14, thus causing the base 20*a* of the upper arm 20 to retain a second configuration which prevents movement of the pinion 40.

Referring now to FIGS. 6A and 6B, once the upper arm 20 has been set to the desired length, the positioning of the pinion 40 along the rack 42 can be locked into place to maintain the upper arm 20 at the desired length. In this regard, the upper arm 20 thus also includes a locking mechanism, which can be selectively engaged to allow or prevent movement of the pinion 40 along the rack 42. In this exemplary embodiment, the locking mechanism is effectively defined by the first base plate 12, the second base plate 14, and the fastener 17*c*. Specifically, in this exemplary embodiment, a compressive force can be applied to the pinion 40 by tightening the fastener 17*c* received in the third opening 17 defined by the first base plate 12 and the second base plate 14. As shown by viewing FIGS. 6A and 6B, in sequence, as the fastener 17*c* is tightened, the first base plate 12 and the second base plate 14 are drawn closer to each other, thereby closing a space 18 within the cavity 11 and clamping onto the first head 40*a* and/or second head 40*b* of the pinion 40, thus restricting movement of the pinion 40. Accordingly, in this exemplary embodiment, the base 20*a* of the upper arm 20 can thus be transitioned between (i) a first (or open) configuration (FIG. 6A) that permits movement of the pinion 40 along the rack 42, and (ii) a second (or locked) configuration (FIG. 6B) that prevents movement of the pinion 40 along the rack 42. In use, the base 20*a* of the upper arm 20 can be left in the first (open) configuration to permit compression and distraction of vertebrae. In such an implementation, the locking mechanism defined by the first base plate 12, the second base plate 14, and fastener 17*c* can thus be characterized as being in a "disengaged" or "unlocked" configuration.

Figure 7:
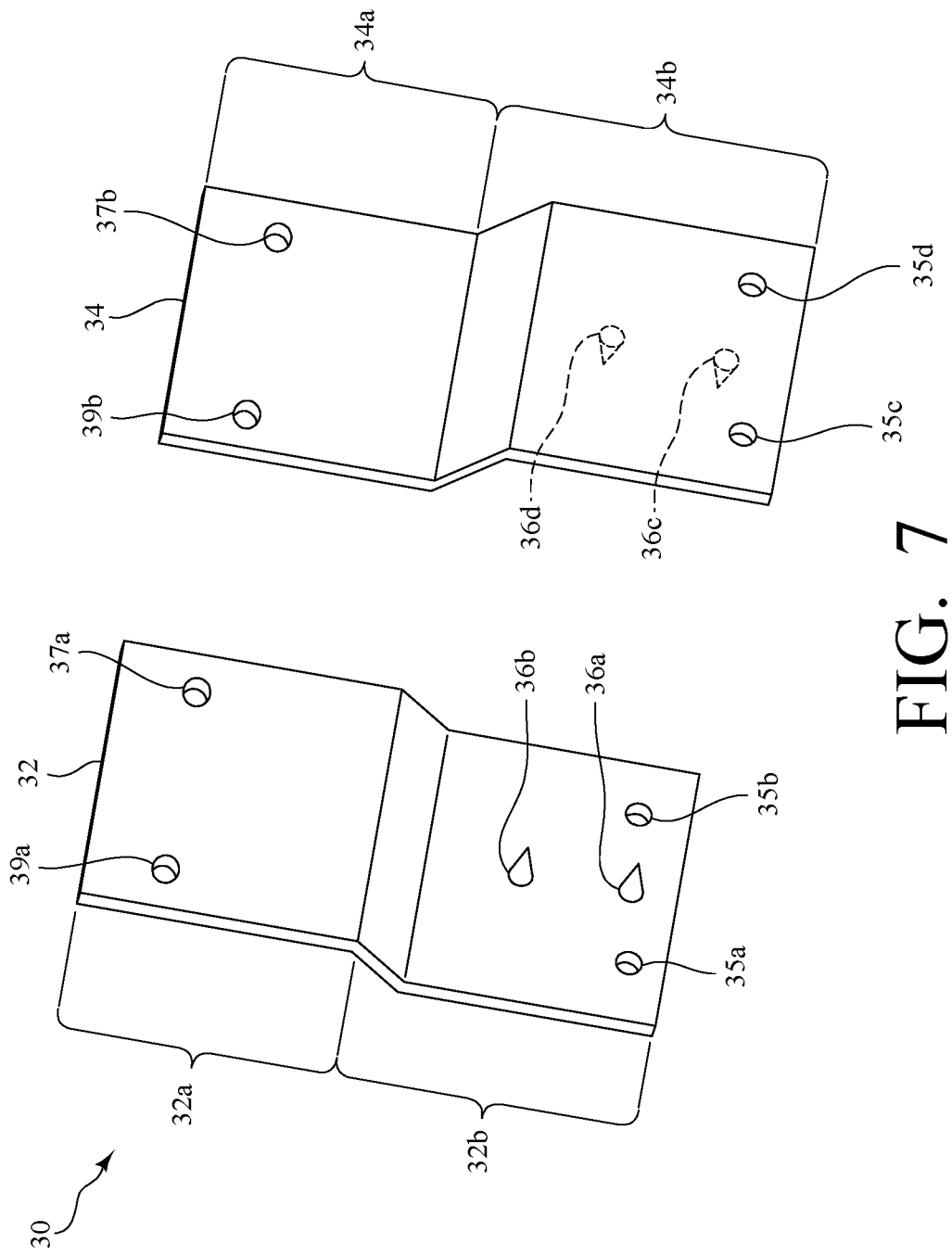
FIG. 7 is perspective view of a lower arm of the exemplary lumbar process static and dynamic stabilization device of FIG. 1, with a first side portion of the lower arm disassociated from a second side portion of the lower arm.

FIG. 7 is a perspective view of the lower arm 30 of the device 10 of FIG. 1, with a first side portion 32 of the lower arm 30 disassociated from a second side portion 34 of the lower arm 30.

Referring now to FIGS. 1 and 7, in this exemplary embodiment, the lower arm of the device 10 is defined by, and thus can be characterized as including, the first side portion 32 and the second side portion 34. The first side portion 32 and the second side portion 34 each include an upper section 32*a*, 34*a* and a lower section 32*b*, 34*b*. When combined, the respective lower sections 32*b*, 34*b* of the first side portion 32 and the second side portion 34 collectively define a brace 30*a*, which is configured to receive and be affixed to a second target spinous process, which, in this example (FIGS. 1, 1A, 2A, and 2B), is the spinous process 110*d* corresponding to the fourth vertebrae 112*d*. Thus, like the brace 20*b* of the upper arm 20, the brace 30*a* of the lower arm 30 also has a shape similar to that of a stirrup. In this regard, the respective lower sections 32*b*, 34*b* of the first side portion 32 and the second side portion 34 also define a cavity 33 in which the second target spinous process is received. When combined, the respective upper sections 32*a*, 34*a* of the first side portion 32 and the second side portion 34 define a base which can be secured to the base 20*a* of upper arm 20. In this exemplary embodiment, the upper section 32*a* and the lower section 32*b* of the first side portion 32 are integrally formed, and the upper section 34*a* and the lower section 34*b* of the second side portion 34 are also integrally formed. Thus, in this exemplary embodiment, the brace 30*a* of the lower arm 30 is not configured for movement with respect to the base of the lower arm 30 (unlike the upper arm 20).

Referring still to FIGS. 1 and 7, in this exemplary embodiment, the lower section 32*b* of the first side portion 32 defines a first pair of holes 35*a*, 35*b*, and the lower section 34*b* of the second side portion 34 defines a second pair of holes 35*c*, 35*d*. In use, the first pair of holes 35*a*, 35*b* and the second pair of holes 35*c*, 35*d* are aligned, so that screws (not shown), such as bicortical or unicortical screws, can be inserted through the first side portion 32 and/or the second side portion 34 as necessary to secure the second spinous process in the cavity 33 of the brace 30*a* of the lower arm 30. In this exemplary embodiment, the interior surfaces of the first and second side portions 32, 34 of the brace 30*a* are also provided with bone spikes 36*a*, 36*b*, 36*c*, 36*d* to further assist in securing the brace 30*a* of the lower arm 30 to the second spinous process.

Referring now specifically to FIG. 7, in this exemplary embodiment, the upper section 32*a* of the first side portion 32 of the lower arm 30 defines a first hole 37*a* and a second hole 39*a*. The upper section 34*a* of the second side portion 34 of the lower arm 30 similarly defines a first hole 37*b* and a second hole 39*b*. When the first side portion 32 and the second side portion 34 of the lower arm 30 are combined, the first holes 37*a*, 37*b* collectively define a first opening corresponding to the first opening 13 of the upper arm 20, and the second holes 39*a*, 39*b* collectively define a second opening corresponding to the second opening 15 of the upper arm 20.

Figure 8:
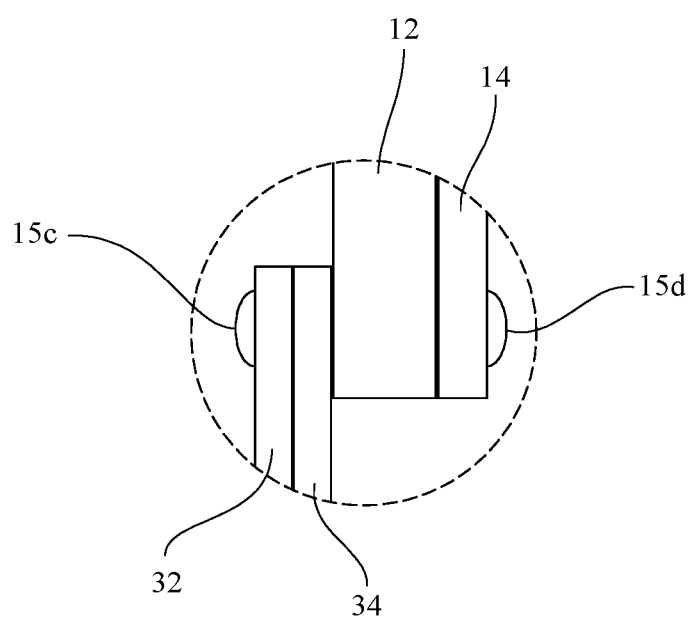
FIG. 8 is an enlarged view of a connection between the upper arm and the lower arm of the exemplary lumbar process static and dynamic stabilization device of FIG. 1.

FIG. 8 is an enlarged view of the connection between the upper arm 20 and the lower arm 30.

Referring now to FIGS. 1, 3, 4, 7, and 8, the upper arm 20 and the lower arm 30 are secured together by aligning the first opening 13 of the upper arm 20 with the opening defined by the first holes 37*a*, 37*b* of the first and second side portions 32, 34 of the lower arm 30, and then inserting a fastener 13*c* therethrough, which, in this exemplary embodiment, then engages and is secured by a nut 13*d*. Furthermore, in this exemplary embodiment, the holes 13*a*, 13*b* of the first opening 13 of the upper arm 20 and the holes 37*a*, 37*b* of the first and second side portions 32, 34 of the lower arm 30 are each common round holes that receive the fastener 13*c*, thus creating a pivot connection which enables the upper arm 20 and the lower arm 30 to move relative to each other about an axis defined by the fastener 13*c*. Such a pivot connection permits the device 10 to transition to a desired orientation, for example, a straightened orientation as shown in FIG. 2A or an articulated orientation as shown in FIG. 2B.

Referring still to FIGS. 1, 3, 4, 7, and 8, the upper arm 20 and the lower arm 30 are further secured together by aligning the second opening 15 of the upper arm 20 with the opening defined by the second holes 39a, 39b of the first and second side portions 32, 34 of the lower arm 30, and inserting a fastener 15c therethrough, which, in this exemplary embodiment, then engages and is secured by a nut 15d. Furthermore, in this exemplary embodiment, the second opening 15 of the upper arm 20 is defined by an elongated slot 15a defined by the first base plate 12 and a corresponding elongated slot 15b defined by the second base plate 14, while the corresponding holes 39a, 39b defined by the first and second side portions 32, 34 of the lower arm 30 are common round holes. In this regard, the shape of the second opening 15 of the upper arm 20 thus defines a range in which the upper arm 20 and the lower arm 30 can move relative to each other via the pivot connection formed by insertion of the fastener 13c through the first opening 13 of the upper arm 20 and the opening defined by the first holes 37a, 37b of the first and second side portions 32, 34 of the lower arm 30.

In some embodiments, the device 10 includes a locking mechanism for securing the lower arm 30 in a desired orientation relative to the upper arm 20. In other words, the device 10 can be placed in a "locked" configuration to maintain it in any desired orientation permitted by the pivot connection described above and the second opening 15, which again define the range in which the upper arm 20 and the lower arm 30 can pivot relative to each other. For example, in some implementations, the device 10 could be placed in a locked configuration to maintain the straightened orientation shown in FIG. 2A, while, in other implementations, the device 10 may be placed in a locked configuration to maintain an articulated orientation, such as that shown in FIG. 2B. To place the device in such a locked configuration, in some embodiments, the fastener 15c may be tightened to provide a compressive force that would draw the second side portion 34 of the lower arm 30 into engagement with the first base plate 12 of the upper arm 20, thus resisting any further pivoting of the lower arm 30 with respect to the upper arm 20.

Figure 9:
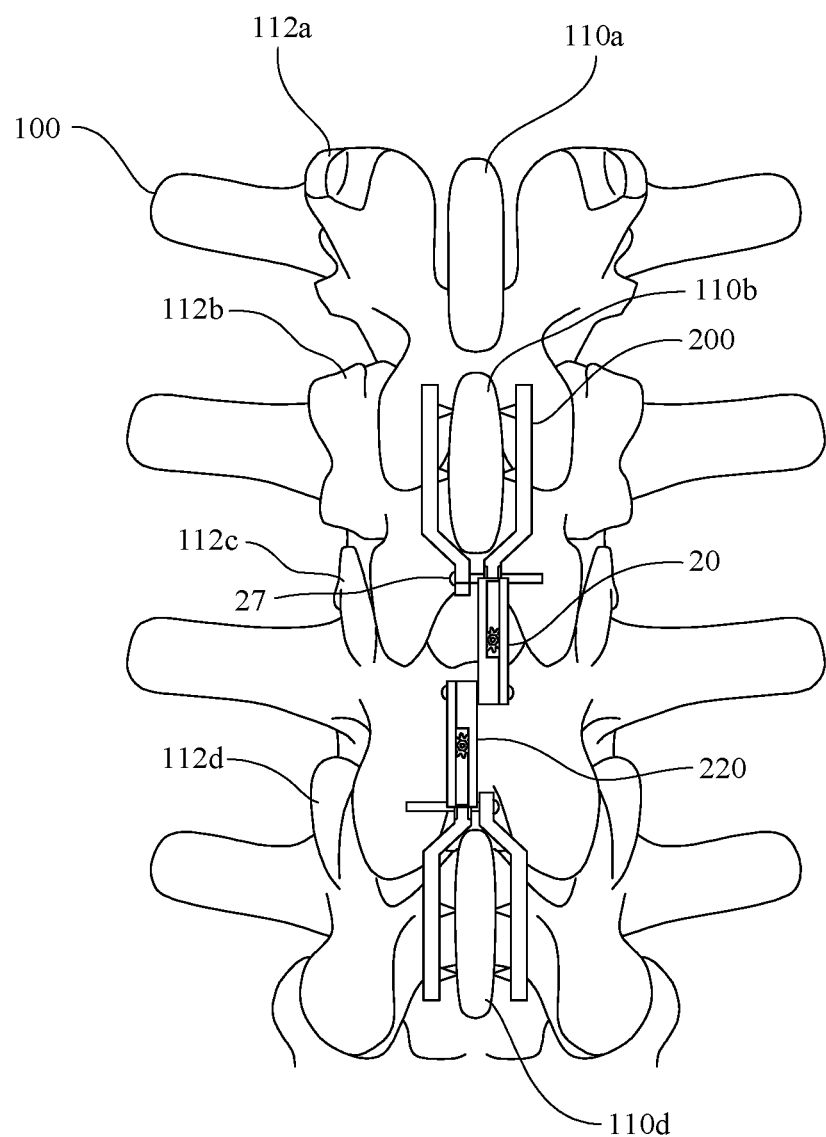
FIG. 9 is a view of another exemplary lumbar process static and dynamic stabilization device made in accordance with the present invention and affixed to two spinous processes of a lumbar spine.

FIG. 9 is a view of another exemplary lumbar process static and dynamic stabilization device 200 (or device 200) made in accordance with the present invention and affixed to two spinous processes 110b, 110d of a lumbar spine 100, which includes a first vertebrae 112a, a second vertebrae 112b, a third vertebrae 112c, and a fourth vertebrae 112d.

Figure 9A:
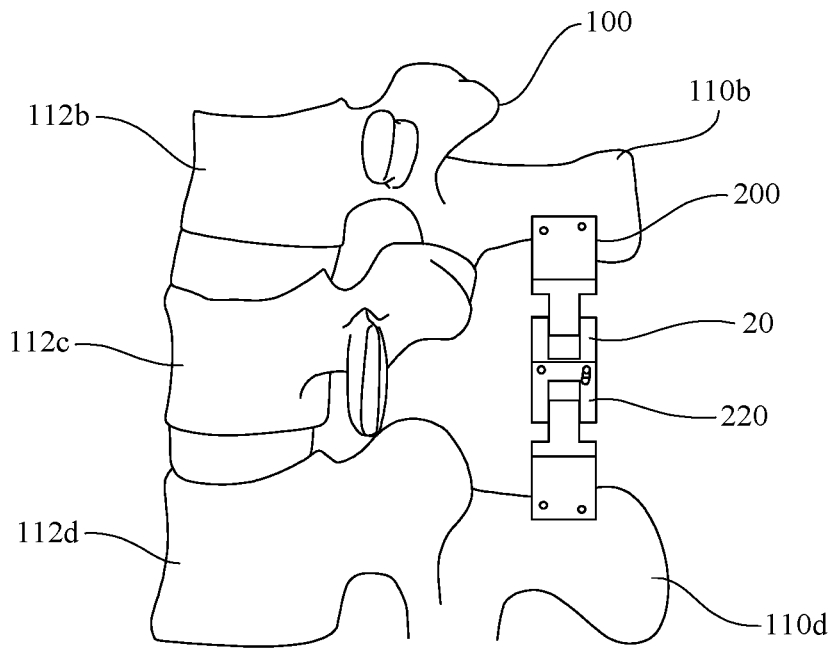
FIG. 9A is a schematic representation of the exemplary lumbar process static and dynamic stabilization device of FIG. 9.

FIG. 9A is a partial side view of the lumbar spine 100 of FIG. 9, with a schematic representation of the device 200 affixed to two spinous processes 110b, 110d and in a straightened orientation.

Figure 9B:
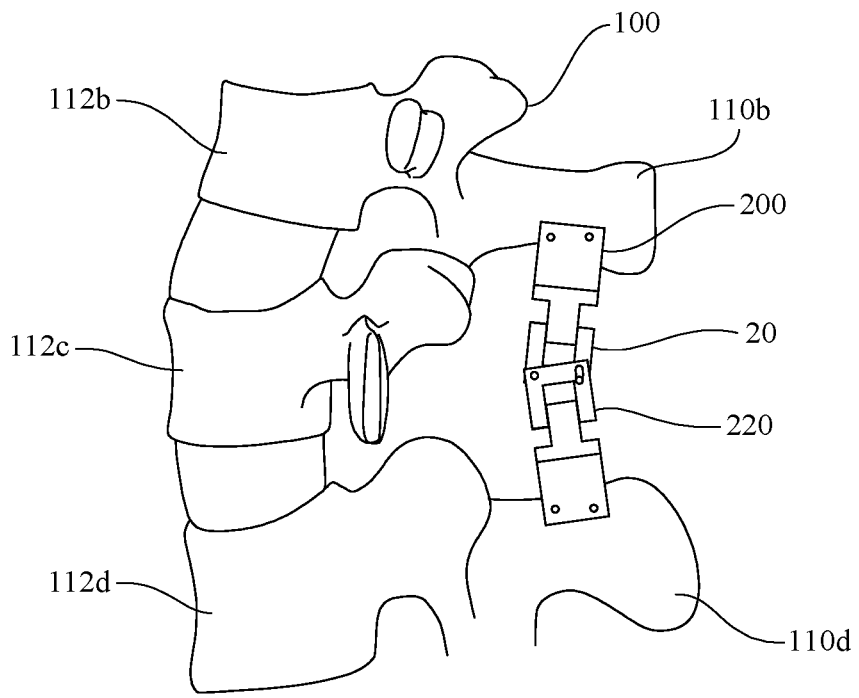
FIG. 9B is another schematic representation of the exemplary lumbar process static and dynamic stabilization device of FIG. 9.

FIG. 9B is a partial side view of the lumbar spine 100 similar to FIG. 9A, but with the schematic representation of the device 200 in an articulated orientation.

Referring now to FIGS. 9, 9A, and 9B, the static and dynamic stabilization device 200 shown in FIG. 9 includes the same upper arm 20 as the device 10 described above with respect to FIGS. 1, 2A, and 2B. The device 200 also includes a lower arm 220 pivotally connected to the upper arm 20, such that the upper arm 20 and the lower arm 220 can pivot relative to each other to transition the device 200 to a desired orientation. However, in this exemplary embodiment, the lower arm 220 is essentially identical to the upper arm 20, and thus includes the same structural features thereof, including the rack-and-pinion arrangement described above with reference to FIGS. 1, 3, 4, 5A, 5B, 6A, 6B, and 8. Thus, in this exemplary embodiment, the length of both the upper arm 20 and the lower arm 220 can be selectively adjusted by repositioning a pinion along a rack of the upper arm 20 and/or lower arm 220 to change the overall length of the device 200.

Figure 10:
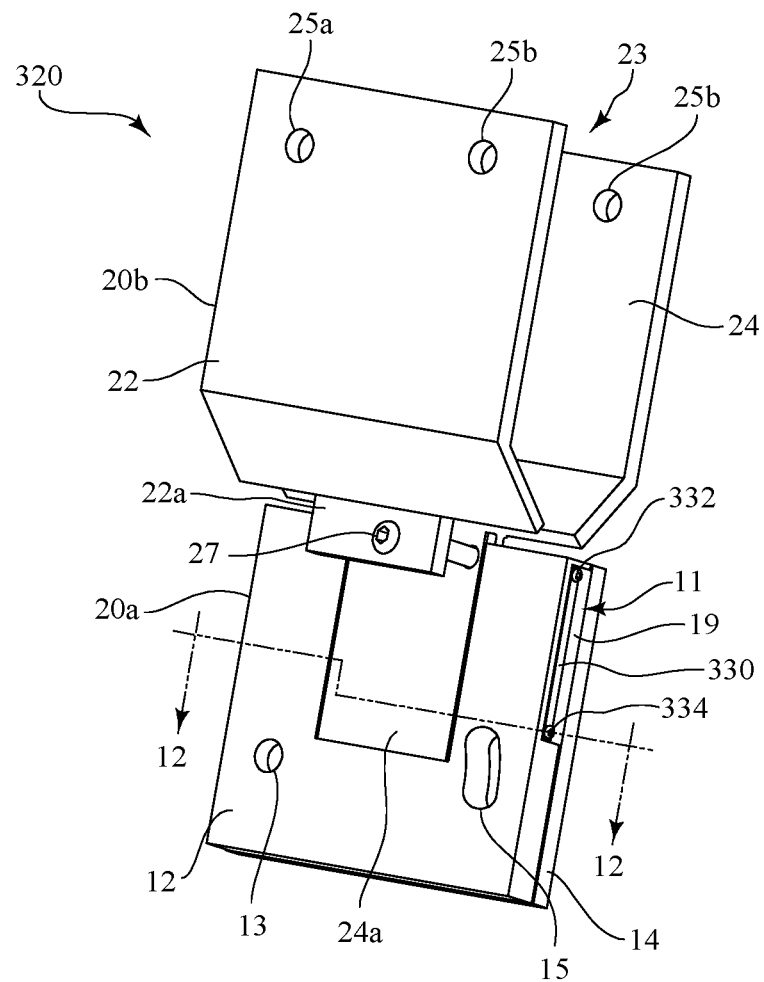
FIG. 10 is a perspective view of an alternate arm, which may be used in place of the upper arm and/or lower arm of the exemplary lumbar process static and dynamic stabilization devices of FIGS. 1 and 9.

FIG. 10 is a perspective view of an alternate arm 320, which may be used in place of the upper arm 20 and/or lower arm 30, 220 of the devices 10, 200 described above with reference to FIGS. 1, 2A, 2B, 9, 9A, and 9B.

FIG. 11 is an exploded view of the alternate arm 320 of FIG. 10.

FIG. 12 is a sectional view of the alternate arm 320 of FIG. 10, taken along line 12-12 of FIG. 10.

Figure 13:
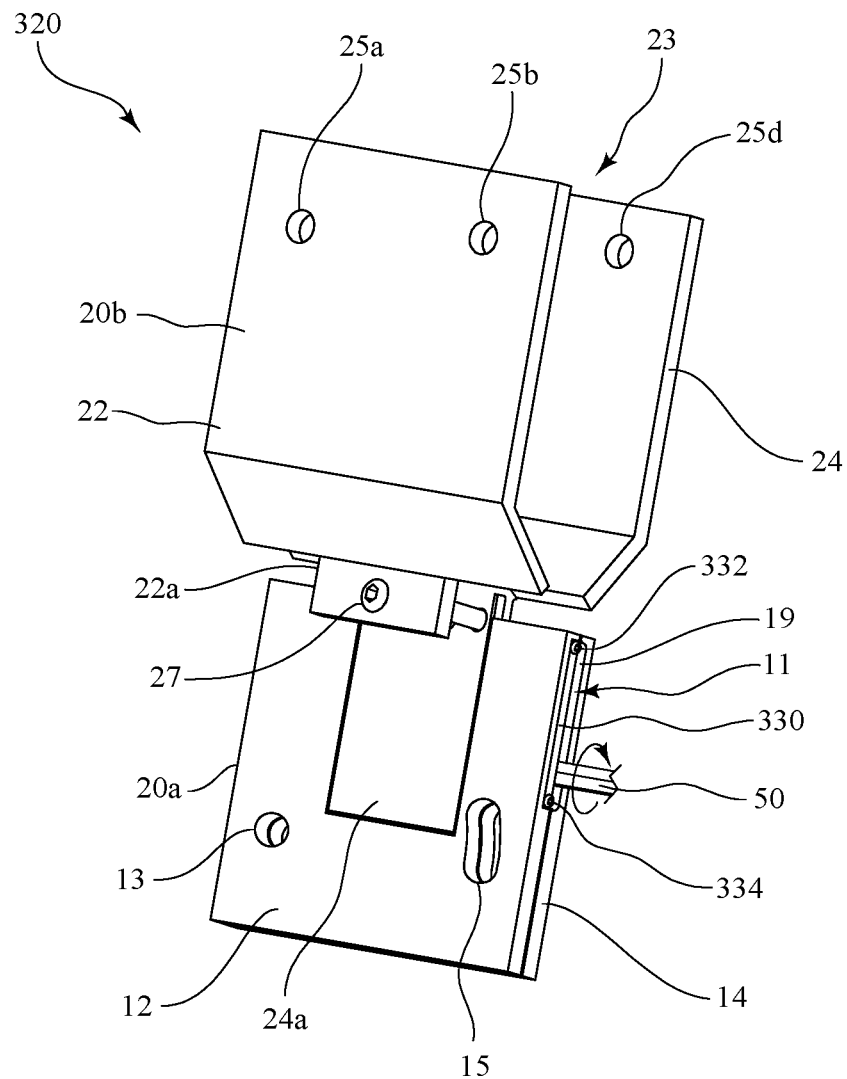
FIG. 13 is another perspective view of the alternate arm of FIG. 10.

FIG. 13 is another perspective view of the alternate arm 320 of FIG. 10.

Referring now to FIGS. 10-13, in this exemplary embodiment, the alternate arm 320 generally includes the same structural components and provides the same functionality as the upper arm 20 described above, except with regards to the locking mechanism that can be selectively engaged to maintain the alternate arm 320 at a desired length. Thus, like components are provided with the same reference numerals as provided above in describing the exemplary lumbar process static and dynamic stabilization devices 10, 200 of FIGS. 1, 2A, 2B, 9, 9A, and 9B.

Referring still to FIGS. 10-13, the alternate arm 320 includes the same pinion-and-rack arrangement as described above with respect to FIGS. 1, 3, 4, 5A, 5B, 6A, 6B, and 8. However, instead of drawing the first and second base plates 12, 14 together via the fastener 17c to clamp the pinion 40 against the rack 42, in this exemplary embodiment, the alternate arm 320 includes a plate 330 which acts as the locking mechanism. The plate 330 is positioned adjacent to an outer face of the second head 40b of the pinion 40 and can be drawn against the second head 40b of the pinion 40 by engaging (tightening) a first fastener 332 and a second fastener 334, which, in this exemplary embodiment, are screws that hold the plate 330 within the access channel 19 defined by the first and second base plates 12, 14 of the alternate arm 320. In this regard, there are threaded openings 12a (one of which is visible in FIG. 12) defined in an interior wall of the first base plate 12 to receive the first fastener 332 and the second fastener 334. The compressive force applied by virtue of the plate 330 being drawn against the second head 40b of the pinion 40 prevents subsequent movement of the pinion 40 along the rack 42. To permit engagement of the tool 50 with the second head 40b of the pinion 40, the plate 330 and corresponding fasteners 332, 334 are preferably offset from the center of the outer face of the second head 40b of the pinion 40, as best shown in FIGS. 12 and 13.

Figure 14:
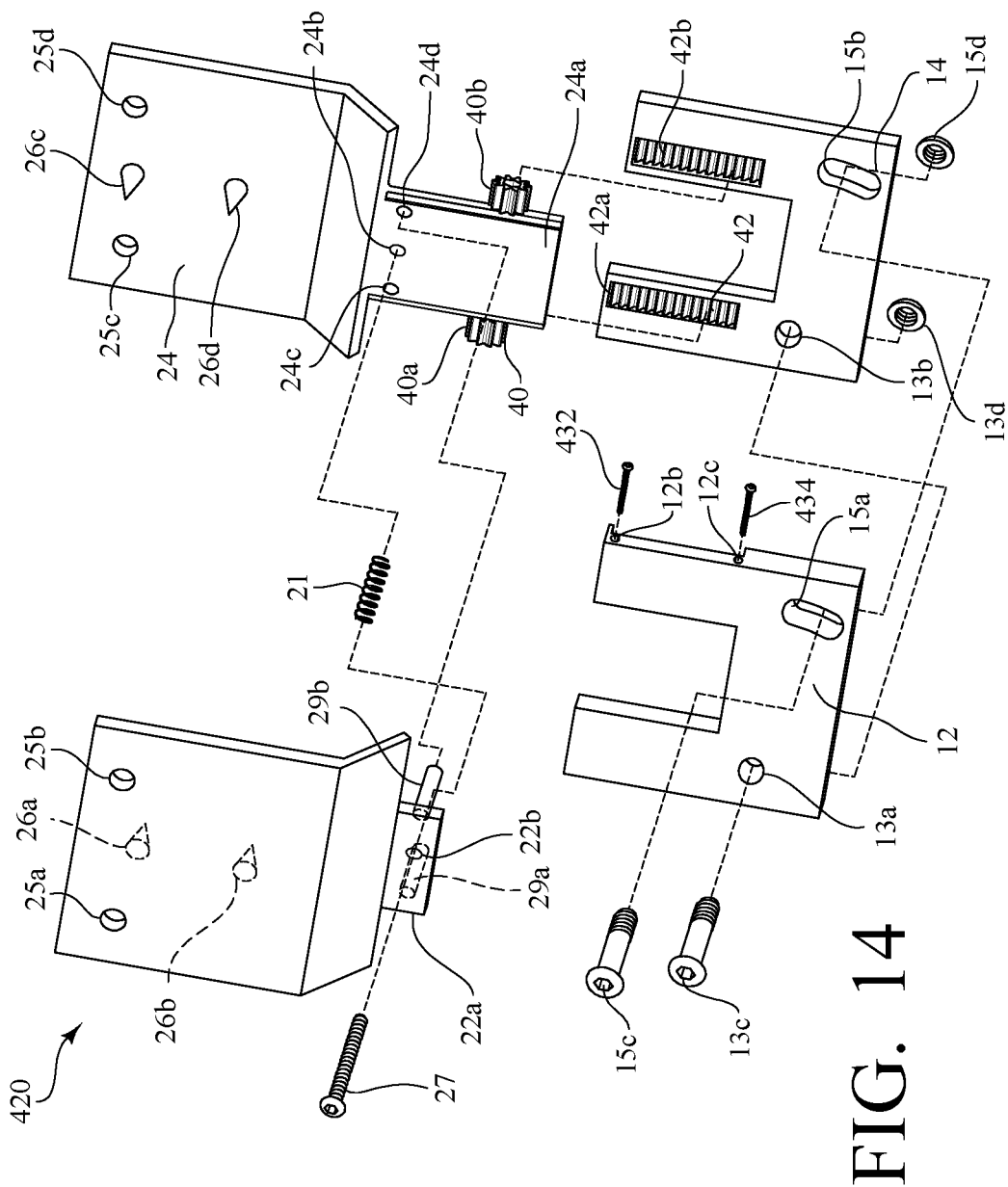
FIG. 14 is an exploded perspective view of another alternate arm, which may be used in place of the upper arm and/or lower arm of the exemplary lumbar process static and dynamic stabilization devices of FIGS. 1 and 9.

FIG. 14 is an exploded perspective view of another alternate arm 420, which may be used in place of the upper arm 20 and/or lower arm 30, 220 of the devices 10, 200 described above with reference to FIGS. 1, 2A, 2B, 9, 9A, and 9B.

Referring now to FIG. 14, in this exemplary embodiment, the alternate arm 420 generally includes the same structural components and provides the same functionality as the alternate arm 320 described above with reference to FIGS. 10-13, except with regards to the locking mechanism that can be selectively engaged to maintain the alternate arm 420 at a desired length. Thus, like components are provided with the same reference numerals as provided above in describing the alternate arm 320 of FIG. 10.

Referring still to FIG. 14, instead of drawing a plate against an outer face of the second head 40b of the pinion 40, in this exemplary embodiment, two fasteners 432, 434 (which, in this case, are screws) can be tightened to apply pressure to and push the tongue 24a to which the pinion 40 is mounted for rotation towards an interior wall within the cavity 11 defined by the first and second base plates 12, 14, which effectively moves the pinion 40 out of alignment with the rack 42, thus preventing movement of the pinion relative to the rack 42. In this exemplary embodiment, the first base plate 12 defines two threaded openings 12b, 12c which guide the two fasteners 432, 434 into the cavity 11 defined by the first base plate 12 and the second base plate 14.

Figure 15:
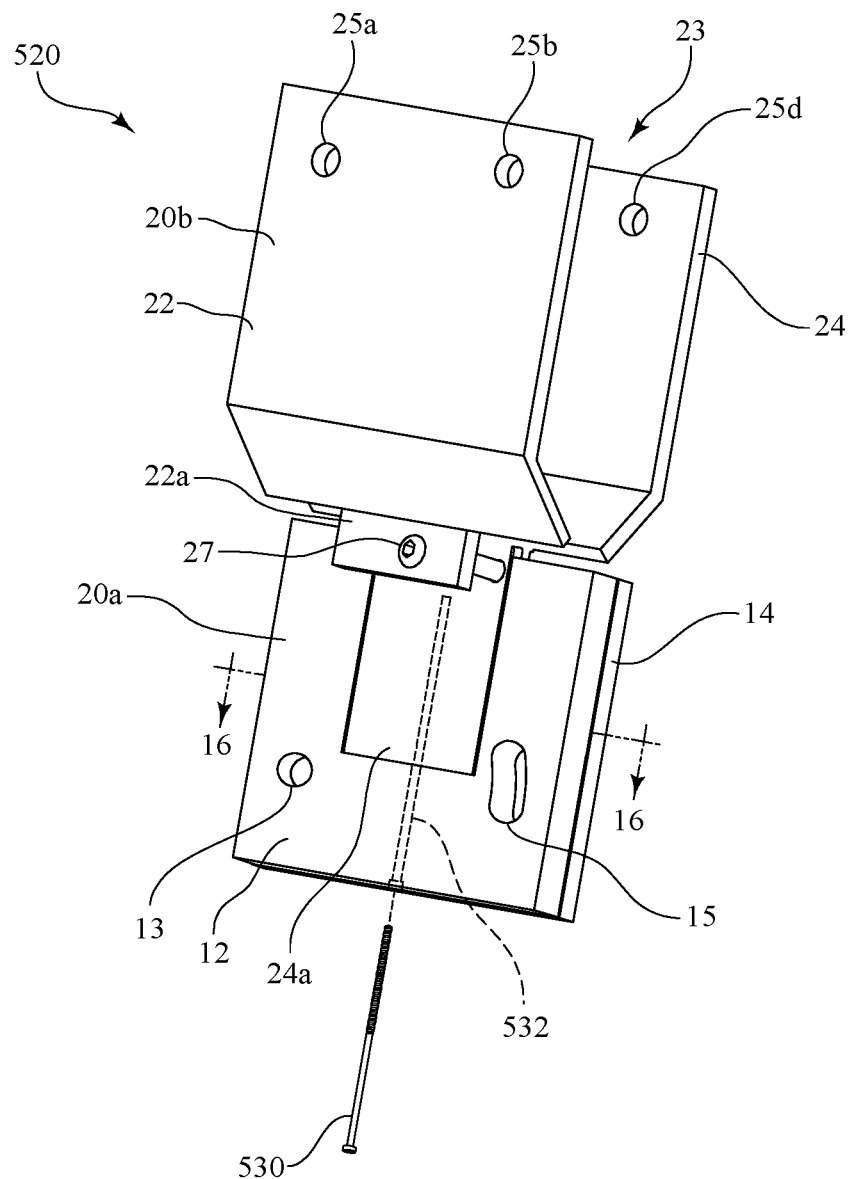
FIG. 15 is a perspective view of yet another alternate arm, which may be used in place of the upper arm and/or lower arm of the exemplary lumbar process static and dynamic stabilization devices of FIGS. 1 and 9.

FIG. 15 is a perspective view of another alternate arm 520, which may be used in place of the upper arm 20 and/or lower arm 30, 220 of the devices 10, 200 described above with reference to FIGS. 1, 2A, 2B, 9, 9A, and 9B.

Figure 16:
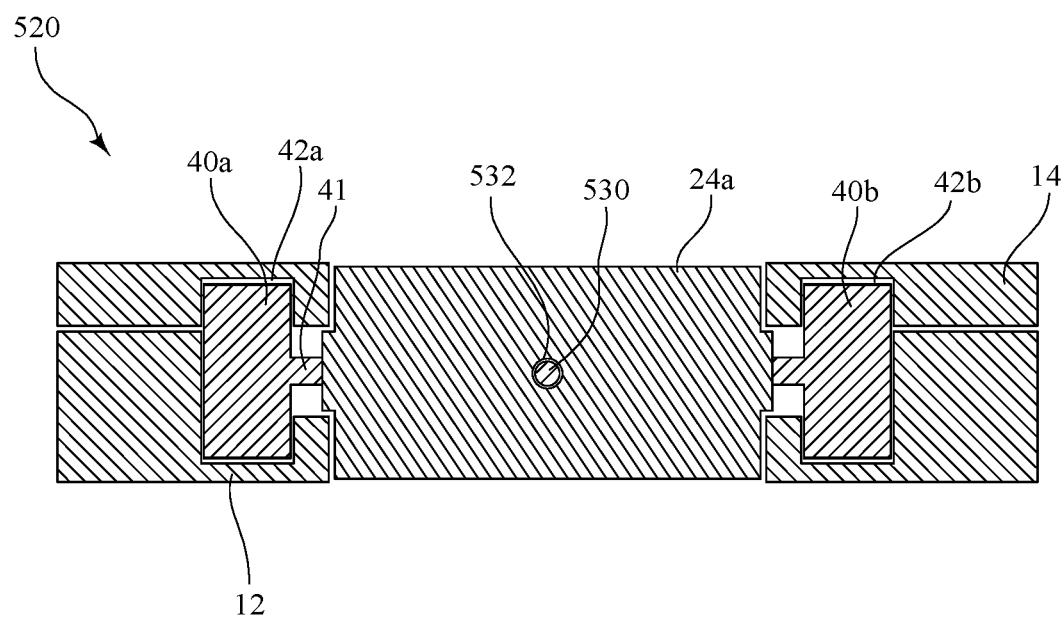
FIG. 16 is a sectional view of the arm of FIG. 15 taken along line 16-16 of FIG. 15.

FIG. 16 is a sectional view of the alternate arm 520 of FIG. 15 taken along line 16-16 of FIG. 15.

Referring now to FIGS. 15 and 16, in this exemplary embodiment, the alternate arm 520 generally includes the same structural components and provides the same functionality as the upper arm 20 described above, except with regards to the locking mechanism which can be selectively engaged to maintain the alternate arm 520 at a desired length. Thus, like components are provided with the same reference numerals as provided above in describing the exemplary lumbar process static and dynamic stabilization devices 10, 200 of FIGS. 1, 2A, 2B, 9, 9A, and 9B.

Referring still to FIGS. 15 and 16, in this exemplary embodiment, once the alternate arm 520 has been adjusted to a desired length by positioning the pinion 40 along the rack 42, movement of the pinion 40 is prevented (or "locked") by threading a locking pin 530 into the tongue 24a of the brace 20b. In this regard, the base 20a and the tongue 24a collectively define a channel 532 (illustrated in dashed lines in FIG. 15) in which the locking pin 530 can be threaded to prevent travel of the pinion 40 along the rack 42.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A lumbar process stabilization device for a spine for use in a static configuration or a dynamic configuration, comprising:
   an upper arm, including a first side portion and a second side portion in a shape of a stirrup, wherein the stirrup defines an upper cavity that is configured to receive a first spinous process of the spine, and wherein either or both of the first side portion and the second side portion of the upper arm defines one or more openings;
   an upper set of one or more screws that are configured to extend through the one or more openings of the first side portion and the second side portion of the upper arm and, in use, into the first spinous process received in the upper cavity;
   a lower arm, including a first side portion and a second side portion in a shape of a stirrup, wherein the stirrup defines a lower cavity that is configured to receive a second spinous process of the spine, and wherein either or both of the first side portion and the second side portion of the lower arm defines one or more openings; and
   a lower set of one or more screws that are configured to extend through the one or more openings of the first side portion and the second side portion of the lower arm and, in use, into the second spinous process received in the lower cavity;
   wherein the lower arm is connected to the upper arm at a pivot connection;
   wherein, in the static configuration, the upper arm and the lower arm are secured in a fixed orientation
   wherein, in the dynamic configuration, the upper arm and the lower arm can move relative to one another about the pivot connection; and
   wherein at least one of the upper arm and the lower arm includes a base and a brace, wherein the brace includes the first side portion and the second side portion which are in the shape of the stirrup, and wherein the brace is configured for movement with respect to the base, such movement allowing for adjustment of an overall length of the device, thereby allowing the device to span one or more vertebrae interspaces of the spine and to compress or distract across a space between the first spinous process to which the upper arm is secured and the second spinous process to which the lower arm is secured.

2. The lumbar process stabilization device as recited in claim 1,
   wherein a fastener extends through an aperture defined by the upper arm and a corresponding aperture defined by the lower arm, forming the pivot connection between the upper arm and the lower arm; and
   wherein a second fastener extends through an elongated slot defined by the upper arm and an aperture defined by the lower arm, such that the elongated slot defines a range in which the lower arm can move relative to the upper arm via the pivot connection in the dynamic configuration.

3. The lumbar process static and dynamic stabilization device as recited in claim 2, wherein the second fastener can be tightened to provide a compressive force which resists pivoting of the lower arm with respect to the upper arm.

* * * * *

UNITED STATES PATENT AND TRADEMARK OFFICE
CERTIFICATE OF CORRECTION

PATENT NO. : 12,458,414 B1  
APPLICATION NO. : 18/641568  
DATED : November 4, 2025  
INVENTOR(S) : Jason Zook Page 1 of 1

It is certified that error appears in the above-identified patent and that said Letters Patent is hereby corrected as shown below:

In the Claims

Claim 1, Column 12, Line 24, replace "orientation" with "orientation;"

Signed and Sealed this  
Second Day of December, 2025

John A. Squires  
*Director of the United States Patent and Trademark Office*